G. H. DUTHIE.
VACUUM STREET CLEANING MACHINE.
APPLICATION FILED JULY 14, 1911.
1,069,773.
Patented Aug. 12, 1913.
2 SHEETS—SHEET 1.
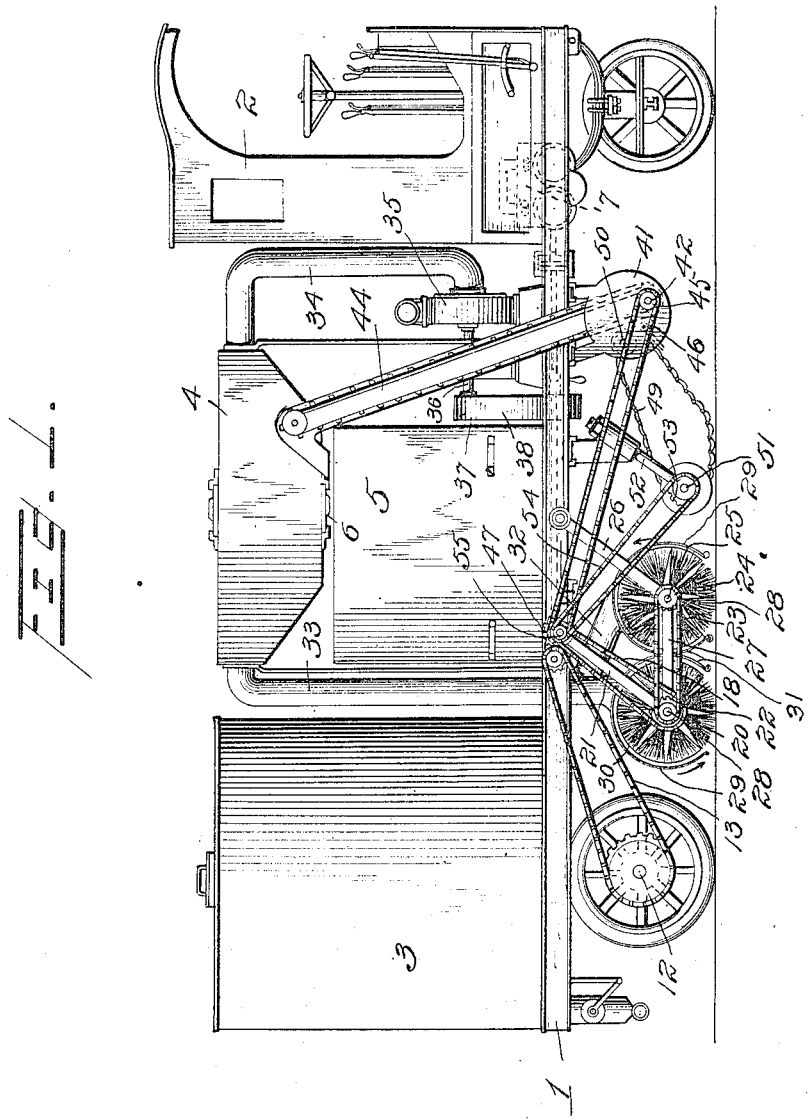
WITNESSES
INVENTOR
George H. Duthie
Watson E. Coleman, Attorney

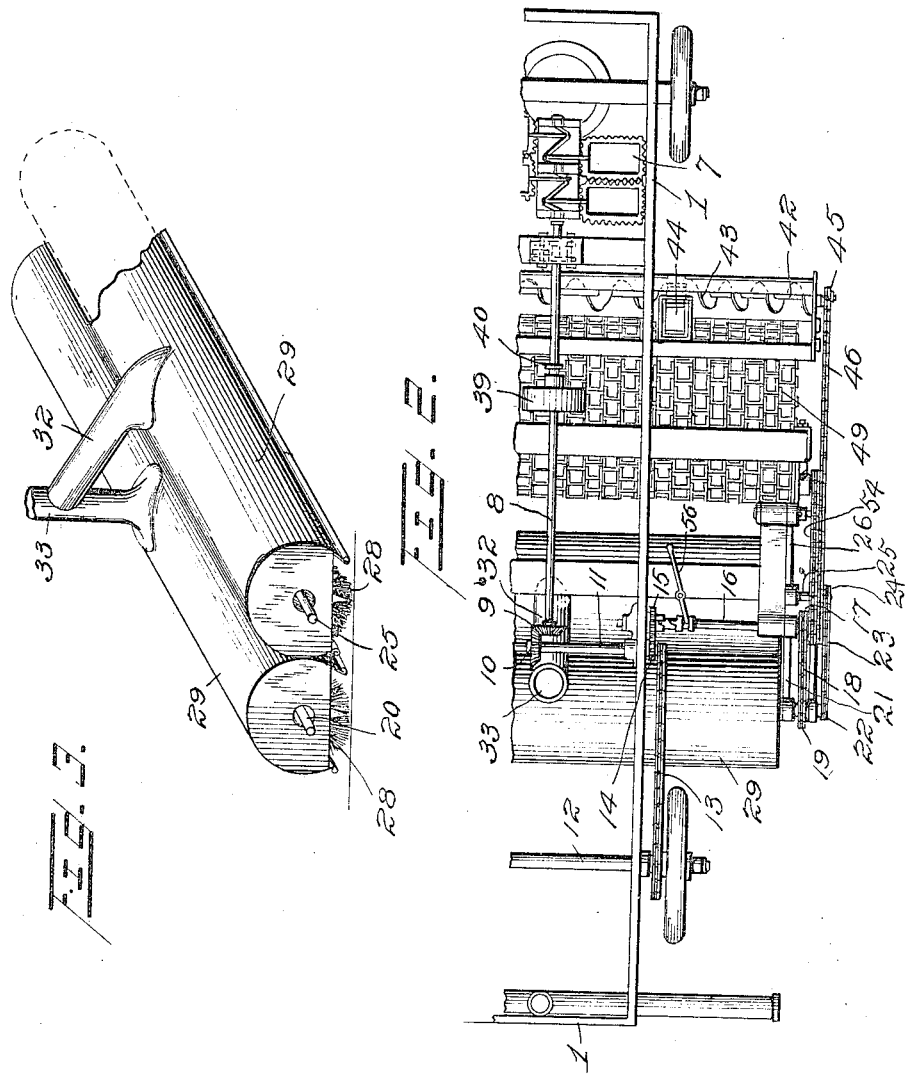

UNITED STATES PATENT OFFICE.

GEORGE H. DUTHIE, OF CLARKSBURG, WEST VIRGINIA.

STREET-CLEANING MACHINE.

1,069,773.

Specification of Letters Patent. Patented Aug. 12, 1913.

Application filed July 14, 1911. Serial No. 638,552.

*To all whom it may concern:*

Be it known that I, GEORGE H. DUTHIE, a citizen of the United States of America, residing at Clarksburg, in the county of Harrison and State of West Virginia, have invented new and useful Improvements in Vacuum Street-Cleaning Machines, of which the following is a full specification thereof.

This invention comprehends certain new and useful improvements in street cleaning machines in which apparatus is provided for scraping, brushing and gathering dirt and dust from streets, alleys and the like, and depositing said dirt and dust in a vacuum tank and removable dirt receptacle, all of the parts of the apparatus being mounted upon the frame-work of a motor truck or similar vehicle.

The present invention relates particularly to means for drawing the dirt and dust, after it has been scraped from the road-bed or pavement and brushed therefrom, into a vacuum tank by the operation of a suction pump which is preferably operated by the same motor or engine which propels the vehicle, although it is to be understood that the pump may be independently driven, if desired.

The invention has for its primary object a simple and efficient means, co-acting with rotary brushes, for sucking the dirt and dust up into an elevated vacuum tank which may be emptied from time to time into a dust and dirt receptacle which is preferably mounted in a detachable manner upon the frame-work of the vehicle underneath the vacuum tank, whereby the receptacle may be removed when filled and carried to a dump and replaced by an empty receptacle, thereby permitting the automobile street cleaning machine to remain in operation upon the streets without the necessity of the entire apparatus being driven to the dump. And the invention also aims to generally improve this class of machinery and to render it more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawings in which, Figure 1 is a side elevation of an automobile street cleaning machine embodying the improvements of my invention. Fig. 2 is a partial top plan view thereof, parts being omitted in order to better show the operating mechanism, and, Fig. 3 is a detail view of the hoods forming part of the vacuum apparatus and adapted to partially encircle the rotary brushes.

Corresponding and like parts are referred to in the following description and designated in the accompanying drawings by like reference characters.

Referring to the drawings, the numeral 1 designates the frame-work of a motor truck or other vehicle, at the front of which is the driver's or operator's cab 2, and at the rear of which is a water tank or reservoir 3 provided with any desired form of spraying apparatus, whereby the streets may be sprayed immediately after being cleaned, and between the cab and reservoir, is the relatively stationary vacuum tank 4 which is held in an elevated position immediately above the removable dirt and dust receptacle 5. The vacuum tank 4 is provided at its bottom with a closure 6 which may be opened from time to time to permit the contents of the tank to drop into the receptacle 5, said receptacle being removable, as hereinbefore noted, whereby it may be removed when filled and replaced by an empty one, without the necessity of driving the entire machine to the dump.

7 designates the internal combustion engine or other motor which is designed to propel the vehicle and to indirectly operate all of the various mechanisms. Said motor embodies a transmission shaft 8 which is provided at its rear end with a bevel pinion 9 meshing with a corresponding pinion 10 secured to a transversely extending counter shaft 11 which is connected to the rear or driving axle 12 by chains 13. It will be understood that the driving devices are duplicated on opposite sides of the vehicle, but as those on one side are exact duplicates of those on the other, a description and illustration of one side will suffice. On each end of the shaft 11 is a spur pinion 14 which meshes with a corresponding pinion 15 on the inner end of a shaft 16. The shaft 16 is journaled at its inner end in a bearing carried by the adjacent side bar 1 of the framework and projects outwardly and laterally therefrom and is journaled at its outer end in a bearing formed on the rear end of a longitudinally disposed bracket 16ª which is riveted or otherwise secured to the outer end of a transversely extending channel bar 15ª, said bar being secured to the side bars 1 of the frame-work and projecting outwardly on both sides of the latter. The shaft 16 is provided at its outer end with a sprocket wheel 17. A chain 18 extends over the sprocket wheel 17 and over another wheel 19, which is secured to a shaft 20, said shaft being journaled at its ends in hanger arms 21. The shaft 20 is provided with another sprocket wheel 22 and a chain 23 passes over said last named sprocket wheel and over a sprocket wheel 24 on a transversely extending shaft 25 journaled in hanger arms 26 corresponding to the hanger arms 21. These hanger arms 21 and 26 are suspended from the rear and forward ends of the bracket 16ª before mentioned and are connected together by brace bars 27. It will thus be understood that both shafts, namely, 20 and 25, are simultaneously rotated. Brushes 28 are mounted on the respective shafts 20 and 25, said brushes extending entirely across the frame-work underneath the latter and being adapted to rest upon the pavement or road-bed. The brushes 28 are mounted in transversely extending substantially cylindrical hoods 29, each of which is formed with inner and outer concentric walls designated 30 and 31, respectively, the inner walls closely fitting the cylindrical rotary brushes 28 and the outer walls 31 being slightly spaced from the walls 30 and extending down close to the pavement or road-bed. The spaces between the inner and outer walls of the hoods 29 communicate with a branch flue 32 and a main flue 33, to which the branch is secured, said flue 33 extending upwardly between the water tank or reservoir 3 and the receptacle 5 and elevated vacuum tank 4 and opening into the latter at the rear end thereof, as clearly indicated in Fig. 1. Connected to the forward end of the vacuum tank 4, is a suction pipe 34 which extends downwardly just behind the cab 2 and which is connected to a suction pump 35, the shaft 36 of which carries a pulley 37, over which a belt 38 passes, said belt also extending around a pulley 39 on the main shaft 8 of the engine.

40 designates a clutch, whereby the pulley 39 may be coupled to or uncoupled from the main drive shaft of the engine whenever it is desired to operate or render inoperative the suction pump.

At each side of the vehicle and in the present embodiment of the invention, suspended from the frame-work immediately underneath the suction pump 35, is a hanger or bracket 41, said brackets being secured to the ends of transversely extending and longitudinally spaced frame bars 41ª which are riveted or otherwise secured to the side bars 1 of the main frame-work and which project outwardly in a lateral direction therefrom. The hangers 41 support a conveyer shaft 42, said shaft having secured thereto, right and left-hand spiral conveyer flights 43, whereby the dirt collected in the casing of the conveyer will be carried to an upwardly and rearwardly inclined elevator 44 which is operated by the shaft 42 and which is designed to deposit the dirt and dust into the top of the receptacle 5. It will be understood that there are two of these elevators, one on each side of the vehicle. In order to operate the conveyer, the shaft 42 is provided at each end with a sprocket wheel 45, over which a sprocket chain 46 passes, said chain also passing around a sprocket wheel 47 on the shaft 16.

At the rear of the conveyer 43, a trailing transversely extending plate 48 is mounted, said plate being pivotally connected at its upper forward edge, as indicated at 48ª, to the brackets 41. Over this trailing plate 48, an endless flexible scraper 49 is adapted to operate, so as to scrape the dust and dirt from the surface of the ground and convey it forwardly and upwardly and deposit it into the conveyer 43. The flexible scraper 49 is suspended at its forward end, as at 50, on a rod or shaft which is journaled at its ends in the brackets 41 and is mounted at its rear end on a shaft 51 which is journaled in hangers 52 supported by the ends of a transversely extending frame bar 52ª. A sprocket wheel 53 is secured to the shaft 51 at each end thereof, and over each of said sprocket wheels 53, a chain 54 passes, said chain also passing around a sprocket wheel 55 on the adjoining end of the adjacent shaft 16. It will thus be understood that the shafts 16 on opposite sides of the vehicle drive the brushes, the conveying and elevating mechanism and the scraping chain. In order to render all of these parts inoperative without stopping the vehicle, I provide each of the shafts 16 with a clutch operated by a shipper lever 56. The frame bar 52ª which, as before stated, supports the hangers 52, is riveted or otherwise secured to the side bars 1 of the main framework and projects outwardly therefrom, as clearly indicated in Fig. 2.

From the foregoing description in connection with the accompanying drawings, the operation of my improved automobile street cleaning machine will be apparent. In the practical use of the machine, as the same is propelled along the street, the flexible scraper 49 will scrape and otherwise loosen up the dirt and dust and carry the heavier particles upwardly and forwardly and deposit them into the conveyer 43, from whence, they will be carried by the elevators 44 upwardly and rearwardly and deposited into the receptacle 5, while the brushes 28 coming along immediately after the scraper, will brush up the dust and finer particles, and the same will be sucked up in between the concentric walls 30 and 31 of the hoods 29 and be drawn up through the flue 33 into the vacuum tank 44 by the suction action of the pump 35 and suction pipe 34.

While the accompanying drawings illustrate what I believe to be the preferred embodiment of my invention, it is to be understood that the invention is not limited thereto, but that various changes may be made in the construction, arrangement and proportions of the parts without departing from the scope of the invention, as defined in the appended claims.

Having thus described my invention, what I claim is:—

1. A machine of the character described, including a supporting frame-work, front and rear rotary brushes carried by the frame-work and extending transversely thereof, means for rotating said brushes, separate hoods partially encircling the brushes and extending close to the lowermost point thereof, each hood embodying inner and outer concentric walls spaced from each other, the inner walls conforming closely to the brushes, an upwardly extending flue communicating at its lower end with the spaces between the walls of the hoods, a vacuum tank connected to the upper end of said flue, and means for creating a suction in said tank.

2. A machine of the character described, including a supporting frame-work, front and rear rotary brushes supported by the frame-work and extending transversely thereof, separate hoods partially encircling the brushes and embodying inner and outer concentric walls spaced from each other, the inner walls conforming closely to the brushes and both walls extending down close to the lowermost point of the brushes, a main flue connected at its lower end to one of said hoods and communicating with the space between the walls thereof, a branch flue connected to said main flue and communicating with the space between the walls of the other hood, a vacuum tank connected to the upper end of the main flue, and means for creating a suction in said tank.

3. A machine of the character described, including a supporting frame-work, front and rear rotary brushes supported by the frame-work and extending transversely thereof, separate hoods partially encircling the brushes and embodying inner and outer concentric walls spaced from each other, the inner walls conforming closely to the brushes and both walls extending down close to the lowermost point of the brushes, a main flue connected at its lower end to one of said hoods and communicating with the space between the walls thereof, a branch flue connected to said main flue and communicating with the space between the walls of the other hood, a vacuum tank connected at one end to the upper end of the main flue, a suction pipe connected to the other end of the vacuum tank and extending downwardly therefrom, a suction pump connected to the lower end of the suction pipe, and means for operating the suction pump, as and for the purpose set forth.

GEORGE H. DUTHIE.

Witnesses:
J. H. CALLAHAN,
JAMES H. DUTHIE.